US006825750B2

(12) United States Patent
Ying

(10) Patent No.: US 6,825,750 B2
(45) Date of Patent: Nov. 30, 2004

(54) CONTROLLABLE ELECTRONIC SWITCH WITH INTERPOSABLE NON-CONDUCTIVE ELEMENT TO BREAK CIRCUIT PATH

(75) Inventor: Jeffrey Ying, Glendora, CA (US)

(73) Assignee: Yingco Electronic Inc., Azusa, CA (US)

(*) Notice: Subject to any disclaimer, the term of this patent is extended or adjusted under 35 U.S.C. 154(b) by 0 days.

(21) Appl. No.: 10/307,222

(22) Filed: Nov. 27, 2002

(65) Prior Publication Data

US 2004/0004533 A1 Jan. 8, 2004

Related U.S. Application Data

(63) Continuation-in-part of application No. 09/903,403, filed on Jul. 10, 2001, now Pat. No. 6,636,141.

(51) Int. Cl.[7] .......................... H01H 37/52; H01H 37/02
(52) U.S. Cl. ........................ 337/105; 337/102; 337/107
(58) Field of Search .............................. 337/14, 16, 36, 337/85, 86, 102, 105, 107, 113, 333, 362, 377

(56) References Cited

U.S. PATENT DOCUMENTS

| | | | | |
|---|---|---|---|---|
| 2,012,215 A | * | 8/1935 | Barthe | 337/4 |
| 2,381,784 A | | 8/1945 | Strobel | 200/122 |
| 2,605,339 A | | 7/1952 | Connolly | 177/351 |
| 3,108,166 A | | 10/1963 | Baker et al. | 200/122 |
| 3,284,597 A | | 11/1966 | Hollis | 200/122 |
| 3,371,175 A | | 2/1968 | Benedik | 200/139 |
| 3,416,117 A | * | 12/1968 | Grosse-Brauckmann | 337/358 |
| 3,501,718 A | | 3/1970 | Chambers | 335/66 |
| 3,601,736 A | | 8/1971 | Sepe | 337/101 |
| 3,660,792 A | | 5/1972 | Strain et al. | 337/102 |
| 3,968,468 A | | 7/1976 | Andersen | 337/107 |
| 4,023,043 A | | 5/1977 | Stevenson | 307/38 |
| 4,117,346 A | | 9/1978 | Burgess | 307/117 |
| 4,124,835 A | * | 11/1978 | Cahill, Jr. | 337/1 |
| 4,247,786 A | | 1/1981 | Hedges | 307/35 |
| 4,345,233 A | | 8/1982 | Matthies | 337/75 |
| 4,360,881 A | | 11/1982 | Martinson | 364/493 |
| 4,476,452 A | | 10/1984 | D'Entremont | 337/102 |
| 5,021,761 A | * | 6/1991 | Stack et al. | 337/68 |
| 5,021,762 A | * | 6/1991 | Hetrick | 337/103 |
| 5,191,310 A | * | 3/1993 | Obermann et al. | 337/105 |
| 5,675,503 A | | 10/1997 | Moe et al. | 364/492 |
| 5,694,106 A | * | 12/1997 | Wang | 337/79 |
| 5,847,636 A | * | 12/1998 | Sehlhorst | 337/303 |
| 5,854,585 A | * | 12/1998 | Kingma | 337/367 |
| 5,870,014 A | | 2/1999 | Nield, Jr. et al. | 337/362 |
| 5,892,428 A | | 4/1999 | Hsu | 337/363 |
| 5,936,505 A | * | 8/1999 | Yu | 337/66 |
| 6,075,436 A | | 6/2000 | Hsu | 337/363 |
| 6,411,190 B1 | | 6/2002 | Yamaguchi et al. | 337/401 |
| 6,512,441 B1 | * | 1/2003 | Yu | 337/37 |
| 6,563,414 B2 | * | 5/2003 | Yu | 337/66 |
| 6,590,489 B1 | * | 7/2003 | Ullermann et al. | 337/56 |

FOREIGN PATENT DOCUMENTS

DE 003544989 A1 7/1987

* cited by examiner

*Primary Examiner*—Anatoly Vortman
(74) *Attorney, Agent, or Firm*—Irell & Manella LLP

(57) ABSTRACT

A controllable electronic switch for, e.g., controlling power distribution comprises a deformable member such as a bimetal arm that can be deformed to break an electrical path. The deformable member may be anchored at one end and in controllable contact with an electrical conductor at the other end. A heating element, such as a coil, can be used to selectively heat the deformable member. The controllable electronic switch can alternatively comprise a deformable member that is terminated in a wedge-shaped member. When the deformable member bends in response to being heated, the wedge-shaped member forces apart a pair of contacts thus breaking an electrical path. The wedge-shaped member and/or associated structures may be configured as a cam mechanism with multiple latching positions.

22 Claims, 9 Drawing Sheets

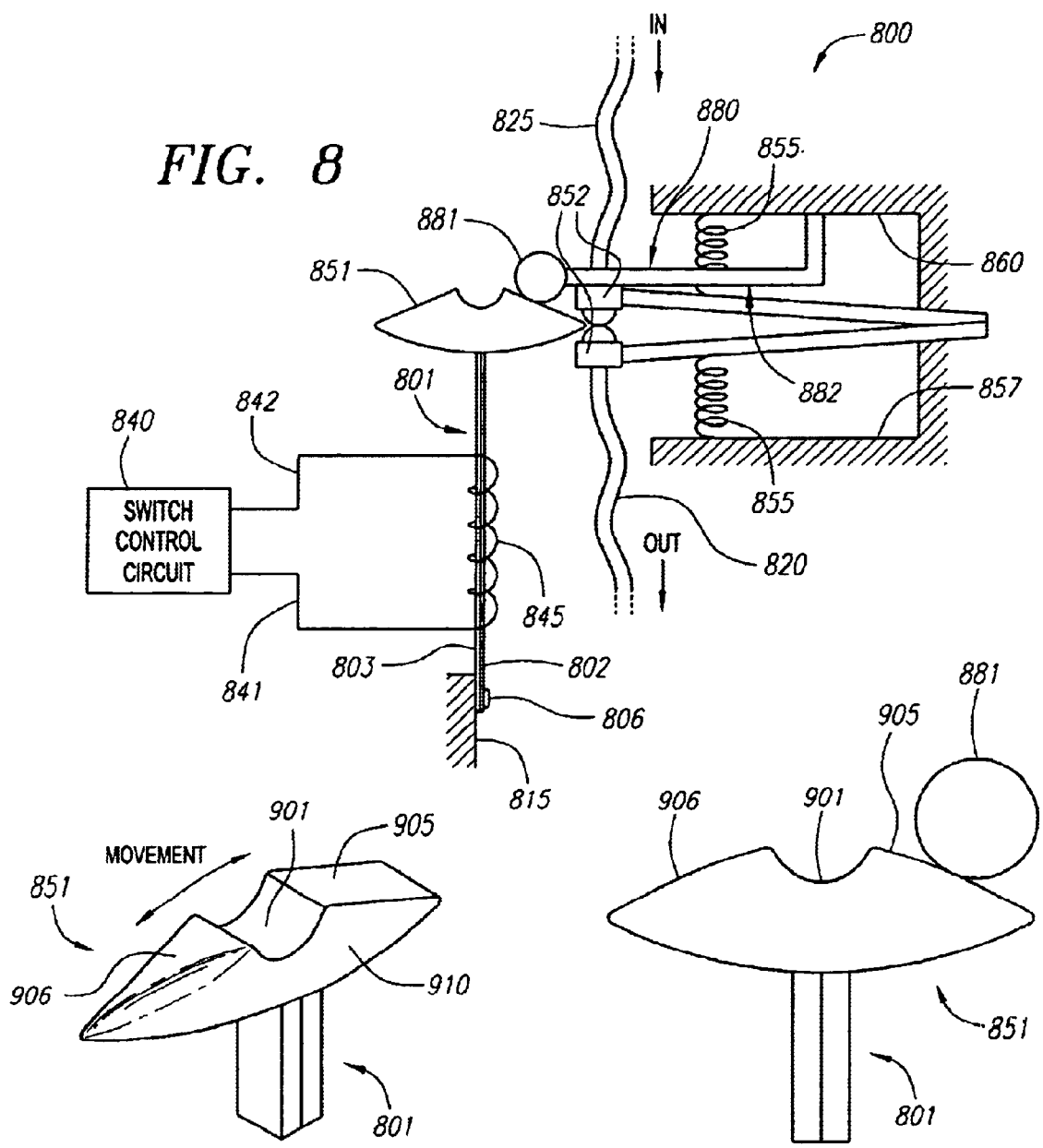

CONTROLLABLE ELECTRONIC SWITCH WITH INTERPOSABLE NON-CONDUCTIVE ELEMENT TO BREAK CIRCUIT PATH

RELATED APPLICATION INFORMATION

This application is a continuation-in-part of U.S. application Ser. No. 09/903,403 filed Jul. 10, 2001, now U.S. Pat. No. 6,636,141 entitled "Controllable Electronic Switch," hereby incorporated by reference as if set forth fully herein.

BACKGROUND OF THE INVENTION

1. Field of the Invention

The field of the invention generally pertains to electronic switches and, more specifically, to controllable electronic switches for controlling power distribution.

2. Background

Power switches have been used for many years to connect and disconnect power sources to loads. A common type of power switch is a circuit breaker, which generally provides a function of preventing an excessive amount of current from being drawn from the power source or into the load, by breaking the electrical circuit path between the source and load when the current limit is reached. A typical circuit breaker has a bimetal arm through which travels a power signal from the source to the load. One end of the bimetal arm is connected to the power signal line, while the other end of the bimetal arm is connected to an electrical conductor from which the power can be distributed to the load. When too much current travels through the bimetal arm, the heat from the current causes the bimetal arm to deform or bend in a predictable manner, which causes the bimetal arm to break contact with the electrical conductor, resulting in a break between the power signal and the load. In this manner, the source and load are both protected from currents which exceed a certain limit.

While circuit breakers are useful for protecting against high current levels, they are generally passive circuit elements whose response depends entirely upon the amount of power being drawn by the load. They typically do not provide active control of a power signal line. However, some resettable circuit breakers have been proposed, which utilize, for example, a spring-operated mechanism allowing a remote operator to open and close the contacts of the circuit breaker. An example of such a circuit breaker is disclosed in U.S. Pat. No. 3,883,781 issued to J. Cotton.

Other types of remotely controlled or operated circuit breakers are described, for example, in U.S. Pat. No. 5,381,121 to Peter et al., and U.S. Pat. No. 4,625,190 to Wafer et al. These circuit breakers involve rather elaborate mechanisms that, due to their complexity, would be expensive to manufacture and potentially subject to mechanical wear or failure.

Besides circuit breakers, other types of circuits have been utilized in controlling power signals. However, these other types of circuits have drawbacks as well. For example, solid state switches (e.g., transistors or silicon-controlled rectifiers (SCRs)) can be used as switches between a power source and load, for controlling distribution of the power signal to the load. However, transistors and SCRs generally have limited power ratings and, at high current levels, can become damaged or shorted. Moreover, transistors or SCRs with high power ratings can be relatively expensive.

It would therefore be advantageous to provide a controllable electronic switch capable of selectively connecting or disconnecting a power source to a load. It would further be advantageous to provide such a switch that is reliable, durable, and low-cost, and that can handle relatively high power demands, such as may be required for residential or commercial applications.

SUMMARY OF THE INVENTION

The invention in one aspect is generally directed to a controllable electronic switch for controlling power distribution.

In one embodiment, a controllable electronic switch comprises a deformable member (e.g., a bimetal member or arm) anchored at one end and in controllable contact with an electrical conductor at the other end. An incoming power wire is connected to the deformable member near the contact point with the electrical conductor. A heating element (such as a coil) is coupled to the deformable member, and is controlled by a switch control signal. When the switch control signal is not asserted, the heating element is inactive, and power is delivered through the incoming power wire across the end of the deformable member to the electrical conductor, from which it can be further distributed to the load. When the switch control signal is asserted, the heating element heats up causing the deformable member to bend until the contact with the electrical conductor is broken. The electrical path from the incoming power wire to the electrical conductor (and hence, to the load) is then broken. So long as the switch control signal is asserted, the heating element continues to keep the deformable member bent and the electrical path broken.

In various embodiments as disclosed herein, a controllable electronic switch comprises a deformable member (such as a bimetal arm) that is terminated in a wedge-shaped member. When the deformable member deforms in response to a control signal, the wedge-shaped member forces apart a pair of contacts thus breaking an electrical path. The wedge-shaped member and/or associated structures may be configured as a cam mechanism with multiple latching positions.

Further embodiments, variations and enhancements are also disclosed herein.

BRIEF DESCRIPTION OF THE DRAWINGS

FIG. 2-1 is a diagram illustrating an example of the flow of electricity when the circuit breaker of FIG. 1 is closed (normal operation), and FIG. 2-2 is a diagram illustrating an example of how the bimetal of the circuit breaker breaks the circuit connection when an over-current situation occurs.

FIG. 4-1 is a diagram illustrating an example of the flow of electricity when the electronic switch of FIG. 3 is closed, and FIG. 4-2 is a diagram illustrating how the bimetal of the electronic switch of FIG. 3 breaks the circuit connection in response to assertion of a control signal.

FIG. 8 is a diagram of another embodiment of a controllable electronic switch using a wedge to break electrical contacts in a circuit path, having a mechanical cam with multiple latching positions.

FIGS. 9-1, 9-2 and 9-3 are diagrams illustrating the controllable electronic switch of FIG. 8 with the latch in an engaged position with respect to the cam.

FIGS. 10-1 through 10-8 are diagrams illustrating different latching positions of the cam of the controllable electronic switch of FIG. 8.

DETAILED DESCRIPTION OF PREFERRED EMBODIMENTS

Figure 1:
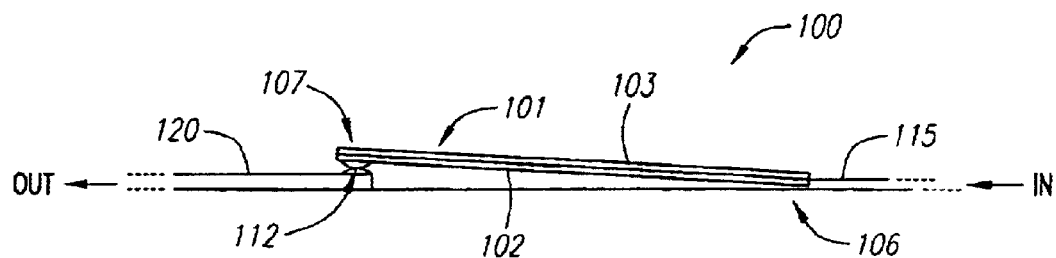
FIG. 1 is a conceptual diagram of a bimetal-based circuit breaker as known in the art.

FIG. 1 is a conceptual diagram of a bimetal-based circuit breaker 100 as known in the art. As illustrated in FIG. 1, the circuit breaker 100 comprises a bimetal arm 101 which is formed of two metallic layers 102, 103. The bimetal arm 101 is anchored at one end 106, and connects at that end 106 to an incoming power signal line 115. At its other end 107, the bimetal arm 101 resides in electrical contact with an electrical conductor 120. The electrical conductor 120 may be connected to a load (not shown) and, in normal operation (i.e., normal current flow), power from the power signal line 115 is conducted through the bimetal arm 101 and the electrical conductor 120 to the load.

The metallic substances of the different metallic layers 102, 103 of the bimetal arm 101 are selected to have different thermal properties such that they heat at different rates. In particular, the metallic substance of the lower metallic layer 102 heats faster than the metallic substance of the upper metallic layer 103. When the amount of current traveling through the bimetal arm 101 is within "normal" limits, the amount of heating caused by the current passing through the bimetal arm 101 (which has a natural resistivity) is small and the bimetal arm 101 does not deform. However, when the amount of current traveling through the bimetal arm 101 exceeds an over-current limit (which is determined largely by the relative thermal properties of the metallic substances used in the metallic layers 102 and 103), the lower metallic layer 102 heats more rapidly than the upper metallic layer 103 and causes the bimetal arm 101 to bend, thus breaking the electrical circuit path between the incoming power signal line 115 and the electrical conductor 120.

Figures 1, 2:
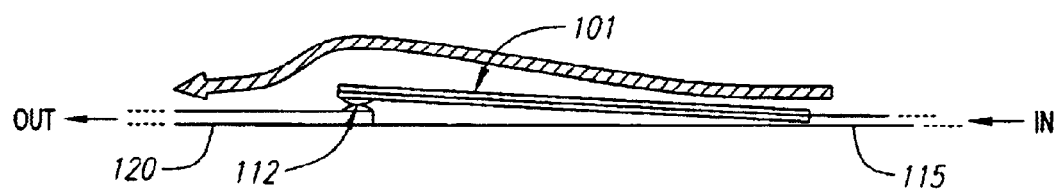
Figure 2:
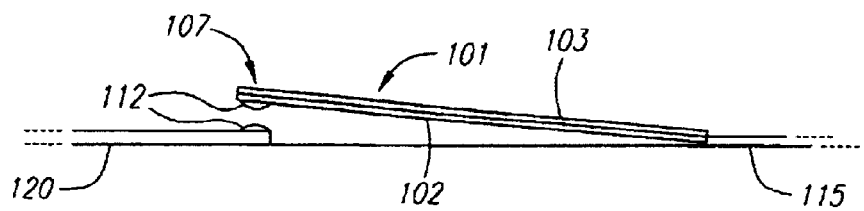

This operation can be illustrated by the diagrams of FIGS. 2-1 and 2-2. FIG. 2-1 is a diagram illustrating an example of the flow of electricity when the circuit breaker 100 of FIG. 1 is closed (normal operation), and FIG. 2-2 is a diagram illustrating an example of how the bimetal arm 101 of the circuit breaker 100 breaks the circuit connection when an over-current situation occurs. As shown in FIG. 2-1, a power signal travels through incoming power wire 115 (marked "IN") through the bimetal arm 101 and across contacts 112, to the electrical conductor 120 (marked "OUT"). So long as the amount of current in the power signal is below the over-current limit, the amount of heating caused by the current passing through the bimetal arm 101 is small, and the bimetal arm 101 does not deform. However, as now shown in FIG. 2-2, when the amount of current traveling through the bimetal arm 101 exceeds the over-current limit, the current heats the bimetal arm 101, but the lower metallic layer 102 heats more rapidly than the upper metallic layer 103 thus causing the bimetal arm 101 to bend. As a result, the contacts 112 gradually separate, breaking the electrical circuit path between the incoming power signal line 115 and the electrical conductor 120. The amount of current needed to cause the circuit breaker 100 to "trip" depends upon the relative thermal properties of the two metallic layers 102, 103 of the bimetal arm 101.

After being tripped, gradually the bimetal arm 101 of the circuit breaker 100 will cool, until eventually the bimetal arm 101 is no longer deformed. As this occurs, the contacts 112 once again form an electrical connection, allowing the power signal to pass from the incoming power wire 115 to the electrical conductor 120.

Figure 3:
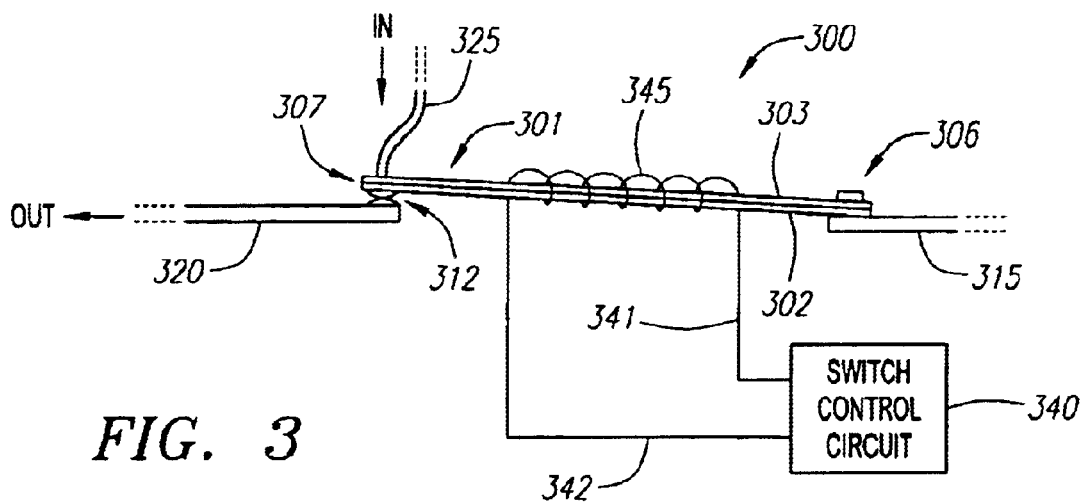
FIG. 3 is a diagram of a controllable electronic switch in accordance with one embodiment as disclosed herein.

FIG. 3 is a diagram of a controllable electronic switch 300 in accordance with one embodiment as disclosed herein. As shown in FIG. 3, the controllable electronic switch 300 comprises a deformable member 301 which may be formed in the general shape of an arm (similar to that shown in FIG. 1 or other embodiments shown herein) and may be comprised of two layers 302, 303 having different thermal properties. Preferably, the two layers 302, 303 are metallic in nature, although any durable substance that bends when heated can be used. As further shown in FIG. 3, the deformable member 301 is preferably anchored at one end 306 to a non-conductive surface 315. At its other end, the deformable member 301 preferably resides in contact with an electrical conductor 320 through contacts 312. An incoming power wire 325 is connected to the deformable member 301 preferably near the contact point with the electrical conductor 320, so as to minimize any power dissipation caused by the current running through the deformable member 301, and also so as to avoid heating the deformable member 301 to any significant degree regardless of the current being drawn. The electrical conductor 320 may be connected to a load (not shown) and, in normal operation (that is, in the absence of assertion of a switch control signal, as explained below), power from the power signal line 325 is conducted through the deformable member 301 and the electrical conductor 320 to the load.

The metallic substances of the different metallic layers 302, 303 of the deformable member 301 are preferably selected to have different thermal properties such that they heat at different rates. In particular, the metallic substance of the lower metallic layer 302 preferably heats faster than the metallic substance of the upper metallic layer 303. When heat is applied to the deformable member 301, the faster heating of the lower metallic layer 302 as compared to the upper metallic layer 303 causes the deformable member 301 to bend, similar to a circuit breaker 100, thus breaking the electrical circuit path between the incoming power signal line 325 and the electrical conductor 320.

Figures 1, 4:
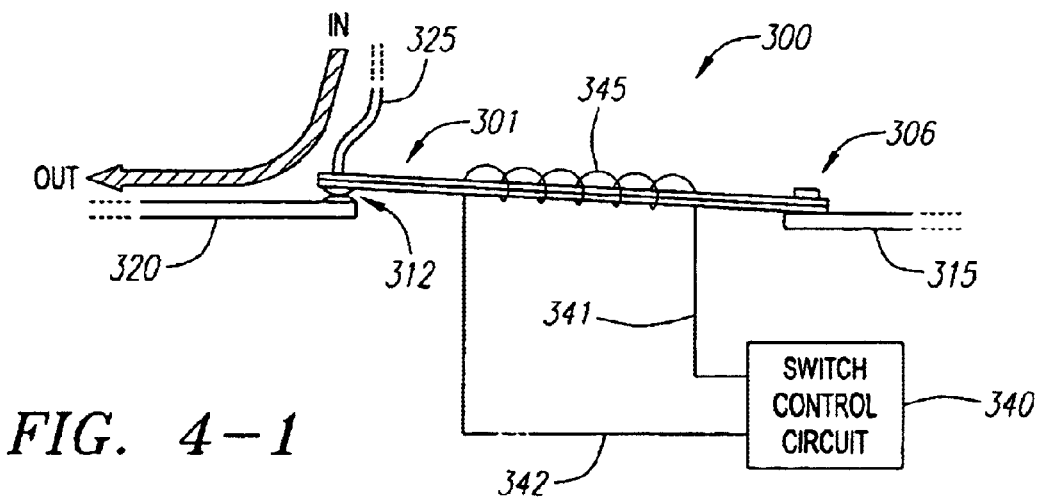
Figures 2, 4:
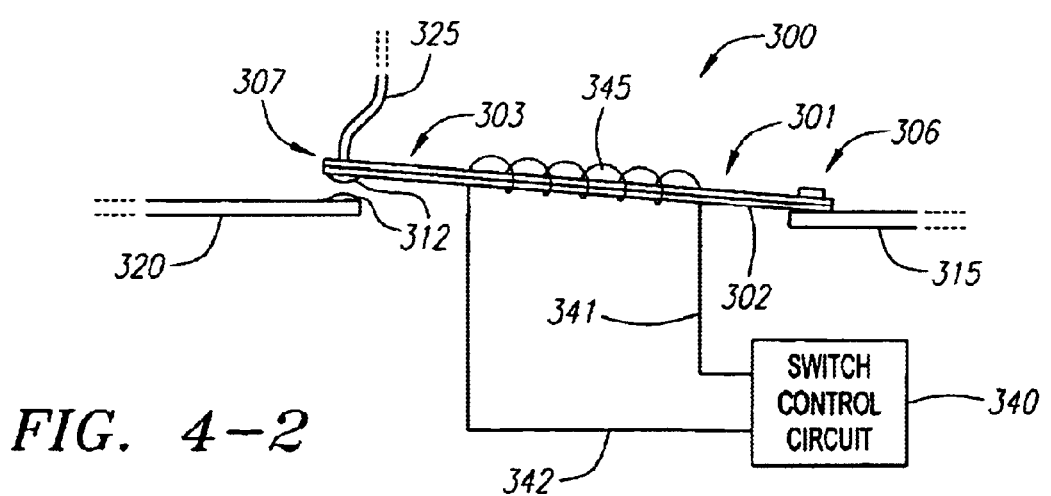

As further illustrated now in FIG. 3, a heating element 345 (such as a resistive coil) is coupled (e.g., wrapped around, in the case of a resistive coil) to the deformable member 301. The heating element 345 is preferably controlled by a switch control circuit 340 connected thereto by a pair of signal lines 341, 342. When the switch control signal output from the switch control circuit 340 is not asserted, the heating element 345 is effectively disconnected (and thus inactive), and power is delivered through the incoming power wire 325 across the end 307 of the deformable member 301, via contacts 312, to the electrical conductor 320, from which it can be further distributed to the load. This operation is illustrated in FIG. 4-1. When, however, the switch control signal from the switch control circuit 340 is asserted, the heating element 345 heats up due to the effect of the current flowing through the heating element 345. Since the lower metallic layer 302 heats more rapidly than the upper metallic layer 303, the deformable member 301 starts to bend. Eventually, as a result of this bending, the contacts 312 gradually separate, breaking the electrical circuit path between the incoming power signal line 325 and the electrical conductor 320, as illustrated in FIG. 4-2.

So long as the switch control signal from the switch control circuit 340 is asserted, the heating element 345 continues to keep the deformable member 301 bent and the electrical path between the incoming power wire 325 and the electrical conductor 320 disconnected. Once the switch control signal from the switch control circuit 340 is de-asserted, the deformable member 301 gradually cools, until eventually the deformable member 301 is no longer deformed. As this occurs, the contacts 312 once again form an electrical connection, allowing the power signal to pass from the incoming power wire 325 to the electrical conductor 320 and then to the load.

In one aspect, the controllable electronic switch 300 illustrated in FIG. 3 can provide a convenient, inexpensive mechanism for controlling the distribution of power from a source to a load. Moreover, the controllable electronic switch 300 need not consume any power when the deformable member 301 is in a closed position, and only requires minimal power to cause the deformable member 301 to open.

The incoming power wire 325 may be connected to the deformable member 301 in any of a variety of manners. The incoming power wire 325 may, for example, simply be welded, spliced or soldered to the moving end 307 of the deformable member 301. Any form of attaching the incoming power wire 325 to the deformable member 301 will suffice so long as electricity conducts between the incoming power wire 325 and the electrical conductor 320 when the deformable member 301 is in a switch-closed position.

Figure 5:
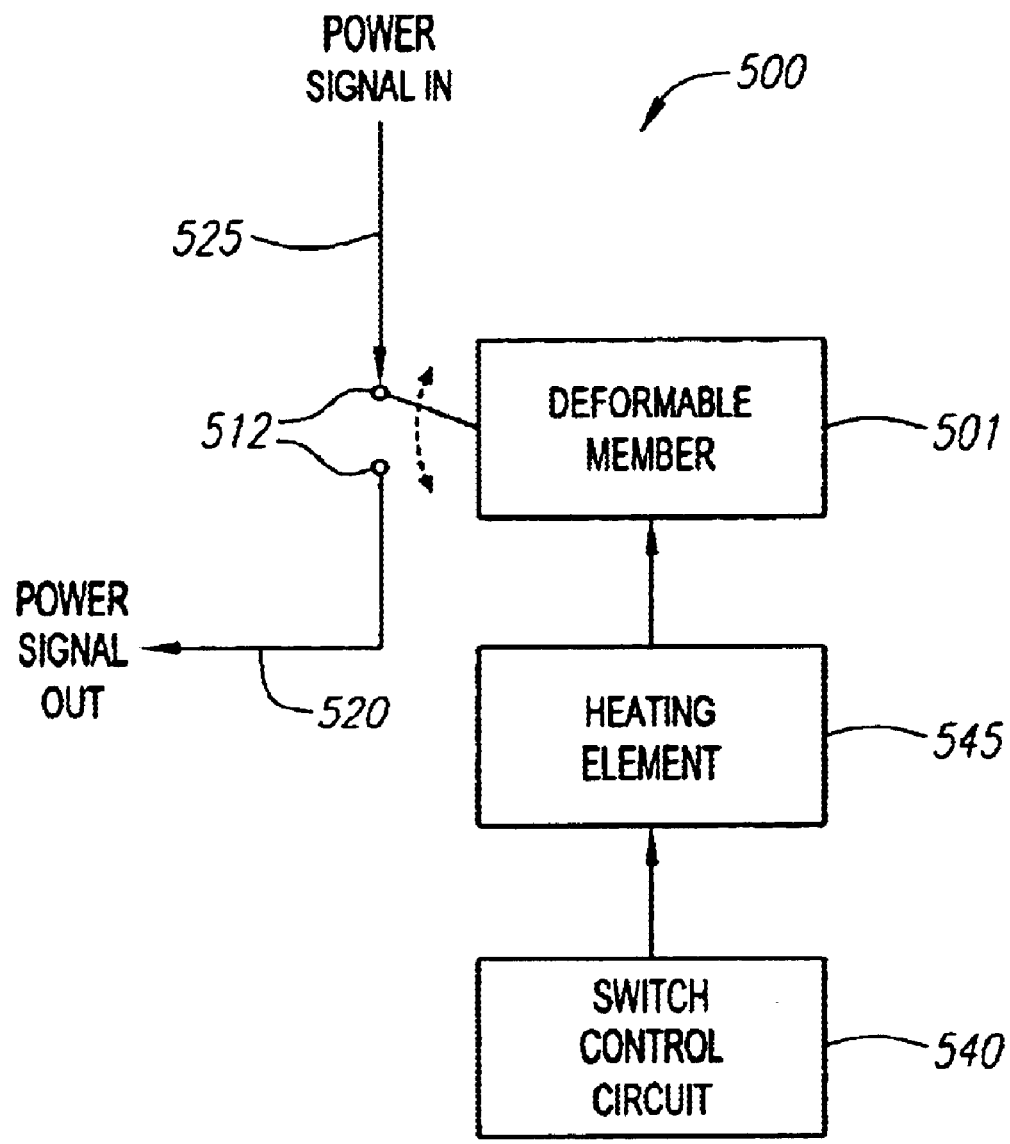
FIG. 5 is a block diagram illustrating a conceptual diagram of a controllable electronic switch in accordance with one or more embodiments as disclosed herein.

FIG. 5 is a block diagram illustrating a more general embodiment of a controllable electronic switch 500. As illustrated in FIG. 5, the controllable electronic switch 500 comprises a deformable member 501 which controllably connects an incoming power wire 525 to an electrical conductor 520. A heating element 545 is coupled to the deformable member 501, and is controlled by a switch control circuit 540. The deformable member 501, which may take the form of, e.g., a bimetal member or arm, preferably allows the incoming power wire 525 to conduct a power signal to the electrical conductor 520 when the deformable member 501 is not being heated by the heating element 545, but preferably causes the connection between the incoming power wire 525 to the electrical conductor 520 to be physically broken when then deformable member 501 is heated by the heating element 545. The heating element 545 may comprise, e.g., a resistive coil or other resistor, and, if a resistive coil, may be conveniently wound around the deformable member 501 if embodied as a bimetal member or arm.

In either of the embodiments illustrated in FIGS. 3 and 5, the deformable member 301 or 501 need not be uniformly straight and, in fact, can be any shape so long as, when heated, it bends in a predictable manner so as to break the electrical connection between the incoming power wire 325 or 525 and the electrical conductor 320 or 520. Moreover, although the deformable member 301 or 501 is described in a preferred embodiment as a bimetal arm having two metallic layers, it alternatively could be made out of any other material (metallic or otherwise) that bends in a predictable manner. Because no current needs to travel from one end of the deformable member 301 or 501 to the other end (unlike a circuit breaker), the deformable member 301 or 501 may, if desired, have non-conductive or insulating portions separating the various areas of the deformable member 301 or 501 from one another. For example, a non-conductive portion (e.g., plastic) could be placed between the area of the deformable member 301 or 501 coupled to the heating element 345 or 545 and either end of the deformable member 301 or 501 (e.g., either end 306 and/or 307 of the deformable member 301 in the example of FIG. 3). Further, the end of the deformable member 301 through which power is conducted (e.g., end 307 in FIG. 3) need not be bimetal, but could be a uniform conductive material (e.g., a single metal). Alternatively, the deformable member 301 or 501 could have additional (i.e., more than two) layers. The primary quality of the deformable member 301 or 501 is that it bends or otherwise deforms sufficiently when heated so as to break the electrical connection of the path of the power signal (e.g., by separating contacts 312 in the example of FIG. 3).

The switch control signal output from the switch control circuit 340 or 540 to the heating element 345 or 545 is preferably a direct current (DC) signal, but could also be an alternating current (AC) signal or hybrid signal. When the switch control signal is not asserted, the switch control circuit 340 may simply short the heating element 345 or 545 (e.g., by shorting wires 341, 342 in the example of FIG. 3), or else simply isolate the heating element 345 or 545 through a buffer or other isolation circuit.

While the heating elements 345 and 545 in FIGS. 3 and 5 have been described in preferred embodiments as a resistive coil, the heating element 345 or 545 could take other forms or configurations. For example, if embodied as a resistive coil, the heating element 345 or 545 need not be wound around the deformable member 301 or 501. The heating element 345 or 545 could be a different type of resistor besides a resistive coil. However, a resistive coil is preferred as the heating element 345 or 545 because it provides relatively even heating over a given area, and is relatively simple to implement and is relatively inexpensive.

The speed of response of the deformable member 301 or 501 to the switch control circuit 340 or 540 may or may not be critical, depending upon the particular application. If the speed of response is not very critical, then the switch control signal can be a very low power signal. If faster response time is desired, the switch control signal can be increased in power, thus causing more rapid heating of the heating element 345 or 545. The switch control circuit 340 or 540 may be provided with its own power source (e.g., a battery), or else it may obtain power from the incoming power wire 325 or 525 or some other available source. The switch control circuit 340 or 540 may be activated by a manual switch (not shown) which causes assertion of the switch control signal and, therefore, eventual opening of the controllable electronic switch 300 or 500, or else may be activated by a remote electronic signal.

Figure 6:
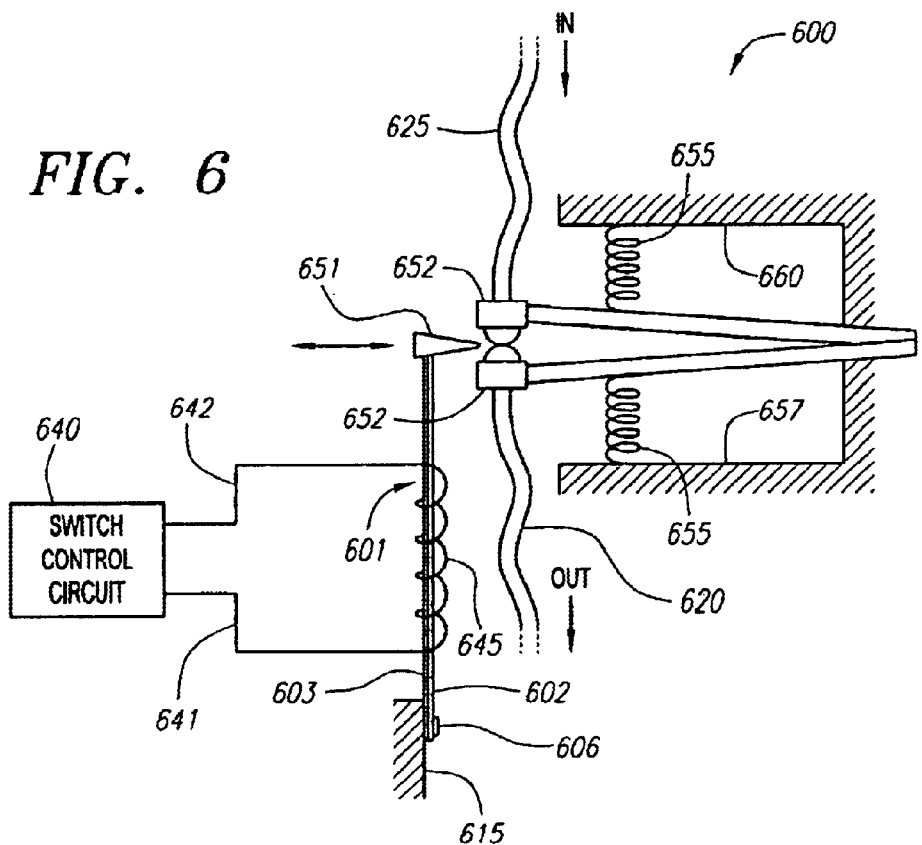
FIG. 6 is a diagram of another embodiment of a controllable electronic switch using a wedge to break electrical contacts in a circuit path.

FIG. 6 is a diagram of another embodiment of a controllable electronic switch 600 using a wedge to physically break electrical contacts in a circuit path. As illustrated in FIG. 6, the controllable electronic switch 600 comprises a generally elongate deformable member 601 which is formed of two layers 602, 603, similar in nature to the deformable member 301 described previously with respect to FIG. 3. In a preferred embodiment, the deformable member 601 comprises a bimetal arm, and the two layers 602, 603 are metallic in nature, although more generally the two layers 602, 603 may be comprised of any suitable materials having sufficiently different thermal properties to carry out the functions described herein. The deformable member 601 is preferably anchored at one end 606 to a non-conductive surface 605. At its other end, the deformable member 601 has a wedge-shaped member 651.

As further illustrated in FIG. 6, narrow end of the wedge-shaped member 651 resides in close proximity to a pair of electrical contacts 652. The pair of electrical contacts 652 reside in contact with a pair of electrical conductors 620, 625, the first electrical conductor 625 serving as an incoming power wire and the second electrical conductor 620 serving as a power delivery means to a load (not shown). In normal operation, power from the first electrical conductor 625 is conducted through the electrical contacts 652 to the second electrical conductor 620 and thereby to the load. The electrical contacts 652 are attached to a pair of non-conductive arms 657, which are anchored to a stable surface 660. A pair of springs 655 or other such means applies force to the non-conductive arms 657 and thereby maintains the electrical contacts 652 in contact in normal operation.

Figure 7:
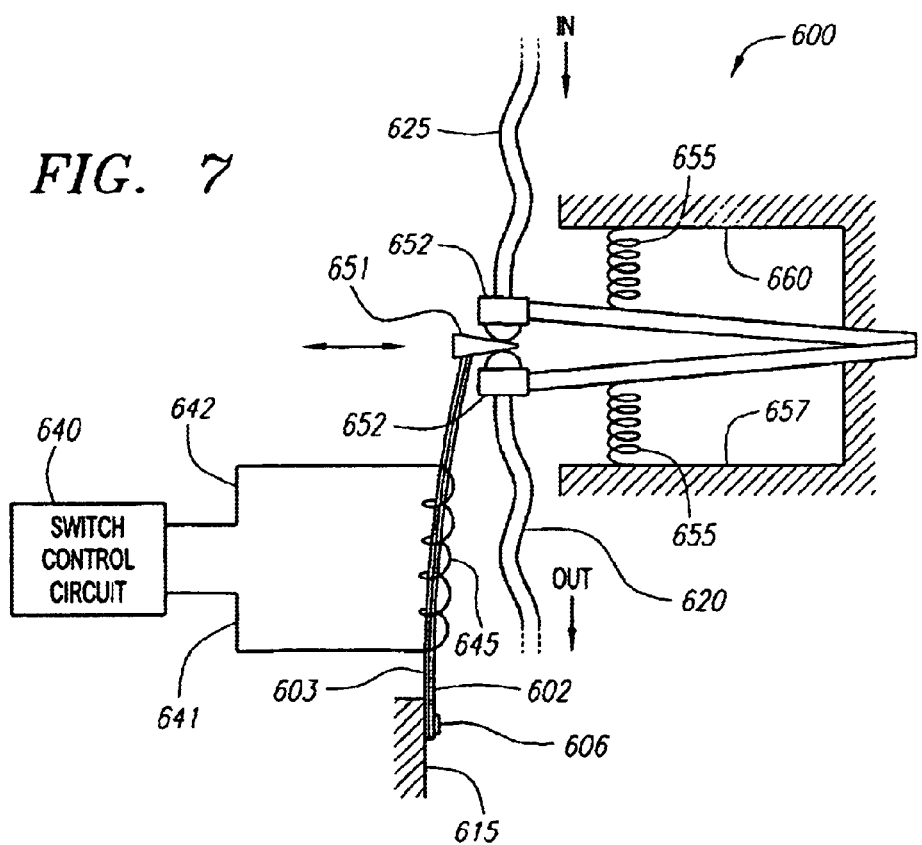
FIG. 7 is a diagram showing an example of how the controllable electronic switch shown in FIG. 6 breaks an electrical connection.

The electrical path formed across the electrical contacts 652 may be broken by application of a control signal to the deformable member 601. To this end, a heating element 645 (such as a resistive coil) is coupled to the deformable member 601 (e.g., wrapped around the deformable member 601, where embodied as a resistive coil). The heating element 645 is preferably controlled by a switch control circuit 640 connected thereto by a pair of signal lines 641, 642. When the switch control signal output from the switch control circuit 640 is not asserted, the heating element 645 is effectively disconnected (and thus inactive), and power is delivered through the incoming power wire 625 across the electrical contacts 652 to the electrical conductor 620, from which it can be further distributed to the load. When, however, the switch control signal from the switch control circuit 640 is asserted, the heating element 645 heats up due to the effect of the current flowing through the heating element 645. Similar to the deformable member 301 previously described with respect to FIG. 3, the deformable member 601 of controllable electronic switch 600 starts to bend. Eventually, as a result of this bending, the wedge 651 if forced between the electrical contacts 652, causing the contacts 652 to gradually separate (with springs 655 gradually compressing), and breaking the electrical circuit path between the incoming power signal line 625 and the electrical conductor 620, as illustrated in FIG. 7.

So long as the switch control signal from the switch control circuit 640 is asserted, the heating element 645 continues to keep the deformable member 601 bent and the electrical path between the incoming power wire 625 and the electrical conductor 620 disconnected. Once the switch control signal from the switch control circuit 640 is de-asserted, the deformable member 601 gradually cools, until eventually the deformable member 601 is no longer deformed. As this occurs, the wedge 651 gradually retracts, causing the electrical contacts 652 to come together and once again form an electrical connection, which in turn allows the power signal to pass from the incoming power wire 625 to the electrical conductor 620 and then to the load.

In one aspect, the controllable electronic switch 600 illustrated in FIG. 6, like the controllable electronic switch 300 of FIG. 3, can provide a convenient, inexpensive mechanism for controlling the distribution of power from a source to a load. Moreover, the controllable electronic switch 600 need not consume any power when the electrical contacts 652 are in a closed position, and only requires minimal power to cause the deformable member 601 to bend and the electrical contacts 652 to spread apart, opening the power signal circuit path.

Figures 1, 10:
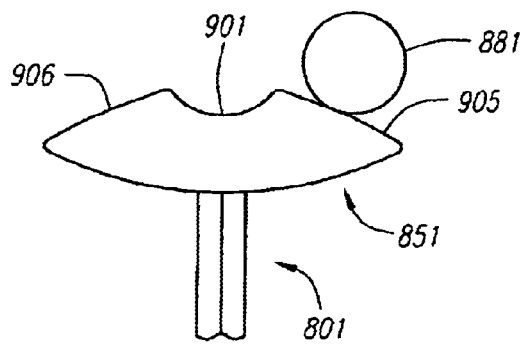
Figures 2, 10:
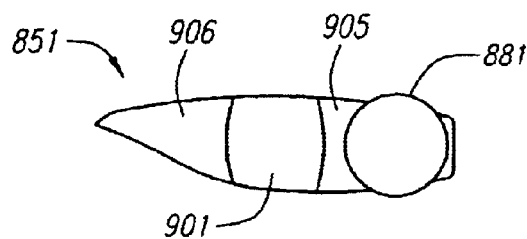
Figures 3, 10:
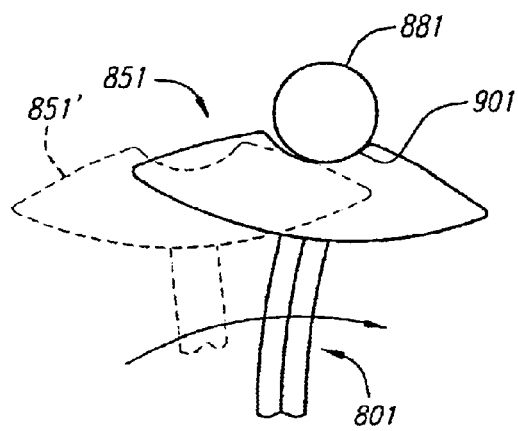
Figures 4, 10:
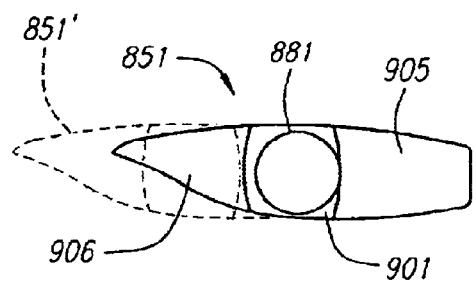
Figures 5, 10:
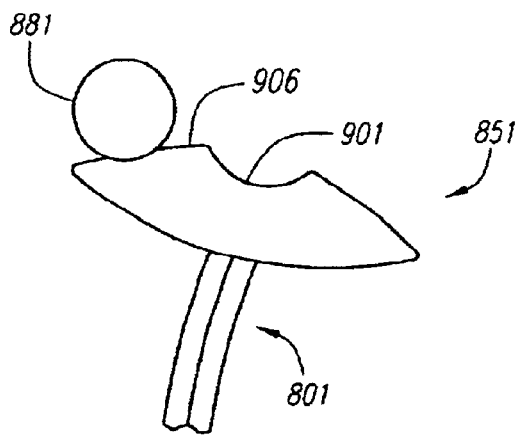
Figures 6, 10:
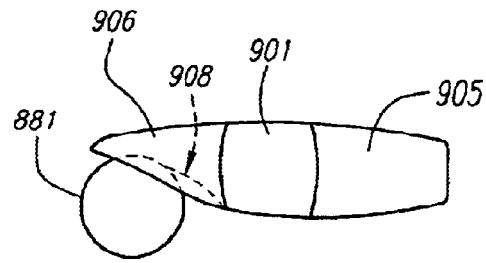
Figures 7, 10:
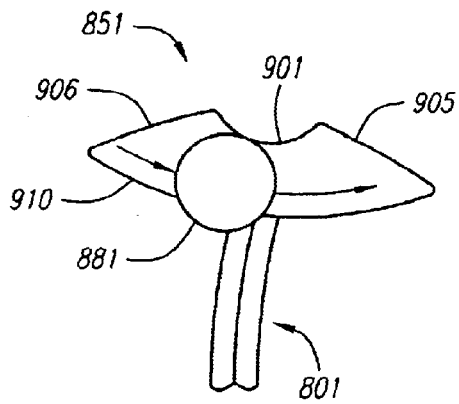
Figures 8, 10:
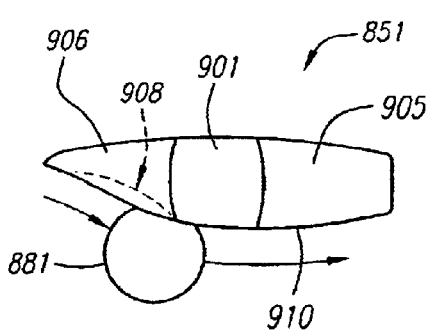

FIG. 8 is a diagram of another embodiment of a controllable electronic switch 800 using a wedge-shaped member to break electrical contacts in a circuit path. Many of the components shown in FIG. 8 are similar in nature to those illustrated in FIG. 6. Thus, for example, the controllable electronic switch 800 of FIG. 8 comprises a generally elongate deformable member 801 which is formed of two layers 802, 803, similar in nature to the deformable member(s) 301, 601 described previously with respect to FIGS. 3 and 6, respectively. In a preferred embodiment, the deformable member 801 comprises a bimetal arm, and the two layers 802, 803 are metallic in nature, although more generally the two layers 802, 803 may be comprised of any suitable materials having sufficiently different thermal properties to carry out the functions described herein. The deformable member 801 is preferably anchored at one end 806 to a non-conductive surface 805. At its other end, the deformable member 801 has a wedge-shaped member 851 that, as will be described in more detail below, functions as a mechanical cam.

As further illustrated in FIG. 8, one end of the wedge-shaped member 851 resides in close proximity to a pair of electrical contacts 852. The pair of electrical contacts 852 reside in contact with a pair of electrical conductors 820, 825, the first electrical conductor 825 serving as an incoming power wire and the second electrical conductor 820 serving as a power delivery means to a load (not shown). In normal operation, power from the first electrical conductor 825 is conducted through the electrical contacts 852 to the second electrical conductor 820 and thereby to the load. The electrical contacts 852 are attached to a pair of non-conductive arms 857, which are anchored to a stable surface 860. A pair of springs 855 or other such means applies force to the non-conductive arms 857 and thereby maintains the electrical contacts 852 in contact in normal operation.

Similar to the FIG. 6 embodiment, the electrical path formed across the electrical contacts 852 may be broken by application of a control signal to the deformable member 801. To this end, a heating element 845 (such as a resistive coil) is coupled to the deformable member 801 (e.g., wrapped around the deformable member 801, where embodied as a resistive coil). The heating element 845 is preferably controlled by a switch control circuit 840 connected thereto by a pair of signal lines 841, 842. When the switch control signal output from the switch control circuit 840 is not asserted, the heating element 845 is effectively disconnected (and thus inactive), and power is delivered through the incoming power wire 825 across the electrical contacts 852 to the electrical conductor 820, from which it can be further distributed to the load. When, however, the switch control signal from the switch control circuit 840 is asserted, the heating element 845 heats up due to the effect of the current flowing through the heating element 845, and as a result the deformable member 801 starts to bend. Eventually, as a result of this bending, the wedge 851 if forced between the electrical contacts 852, causing the contacts 852 to gradually separate (with springs 855 gradually compressing), and breaking the electrical circuit path between the incoming power signal line 825 and the electrical conductor 820, similar to the illustration in FIG. 7.

Unlike the embodiment of FIG. 6, the wedge-shaped member 851 of the controllable electronic switch 800 of FIG. 8 acts as a mechanical cam with multiple latching positions, thus alleviating the need to maintain the control signal to keep the circuit open. When the wedge-shaped member 851 is latched in a first position, it is removed from the electrical contacts 852, which remain closed, and the power signal circuit path is uninterrupted. On the other hand, when the wedge-shaped member 851 is latched in a second position, it forces the electrical contacts 852 apart, thus interrupting the power signal circuit path. In either latched position, no power is required to keep the controllable electronic switch 800 in its current state (open or closed). Latching of the wedge-shaped member 851 in the various positions is accomplished, in this example, by way of a latching member 880 comprising, e.g., an arm 882 terminated in a ball 881 that rests against the wedge-shaped member 851. In the instant example, the arm 882 of the latching member 880 is anchored to surface 860, but the latching member 880 may be anchored to any other available surface instead. Thus, in this example, the latching member 880 is adjacent to the arms 857 supporting the electrical contacts 852.

FIGS. 9-1, 9-2 and 9-3 are diagrams of different views illustrating an example of the wedge-shaped member 851 of the controllable electronic switch 800 of FIG. 8, and in particular FIGS. 9-2 and 9-3 illustrate the wedge-shaped member 851 of FIG. 9-1 latched in the first position. The wedge-shaped member 851 in this example comprises a front wedge section 905 (which may be generally broad-surfaced and sloping), a central socket 901, and a rear wedge section 906 (which may be tapered and sloping) defining a shallow rear socket 908. As best illustrated in FIGS. 9-2 and 9-3, the ball 881 of the latching member 880 rests on the front wedge section 905 when the wedge-shaped member 851 is latched in the first position (the arm 882 is omitted from FIGS. 9-2 and 9-3 for clarifying the other features shown). The ball 881 may effectively hold the wedge-shaped member 851 in place when latched in the first position, although in certain embodiments the ball 881 may not need to contact the wedge-shaped member 851 and would generally lie in proximity therewith.

FIGS. 10-1 through 10-8 are diagrams illustrating how the wedge-shaped member 851 transitions between different latching positions. FIGS. 10-1 and 10-2 are similar to FIGS. 9-2 and 9-3, respectively, and show the wedge-shaped member 851 at rest in the first latched position. FIG. 10-3 illustrates what happens as the deformable member 801 is heated in response to the control signal being applied to the heating element 845 (shown in FIG. 8). In this situation, the deformable member 801 starts to bend, forcing the wedge-shaped member 851 forward. When that occurs, the ball 881 slides over the sloping surface of the front wedge section 905, and comes to rest in the central socket 901 of the wedge-shaped member 851, causing the wedge-shaped member to stabilize in the second latched position. For comparative purposes, the first latched position is represented by a dotted outline 851' of the wedge-shaped member, although the actual dimensions of movement may be somewhat exaggerated for illustration purposes. In practice, movement of the wedge-shaped member 851 by only a few hundredths of an inch may be sufficient to change latched positions. Even after the control signal is de-asserted, the ball 881 retains the wedge-shaped member 851 in the second latched position, by virtue of its resting firmly in the central socket 901. The wedge-shaped member 851 thereby keeps the contacts 852 separated while it is held in the second latching position.

Application of a subsequent control signal causes the wedge-shaped member 851 to return to the first latched position. When the subsequent control signal is applied, the deformable member 801 again heats up, causing it to bend and the wedge-shaped member 851 to gravitate forwards. The ball 881 is thereby forced out of the central socket 901 and onto the second wedge section 906, as illustrated in FIG. 10-5. The ball 881 slides down the tapered surface of the second wedge section 906, and due to the very narrow tail end of the second wedge section 906 (which is preferably asymmetrically tapered) the ball 881 slides off the more sharply tapered side of the second sedge section 906 and is captured by the upper lip of the shallow rear socket 908, as illustrated in FIG. 10-6. The upper lip of the shallow rear socket 908 helps guide the ball 881 along the outer side surface 910 of the wedge-shaped member 851, as illustrated from a side view in FIG. 10-7 and a top view in FIG. 10-8, during which time the arm 882 of the latching member 880 may be forced slightly to the side of the wedge-shaped member 851 (or vice versa). As the deformable member 801 cools, the ball 881 slides along the outer side surface 910 of the wedge-shaped member 851 and eventually reaches the narrow tip region of the front wedge section 905, whereupon the arm 882 of the latching member 880 straightens out and forces the ball 881 onto the surface of the front wedge section 905, returning the wedge-shaped member 851 to the first latched position as illustrated in FIGS. 10-1 and 10-2.

The above process may be repeated as desired to allow the controllable electronic switch 880 to open and close the electrical contacts 852 by having the wedge-shaped member 851 move between the first and second latched positions. The control signal that is applied to cause the wedge-shaped member 851 to move may take the form of, e.g., an impulse signal.

Figure 11:
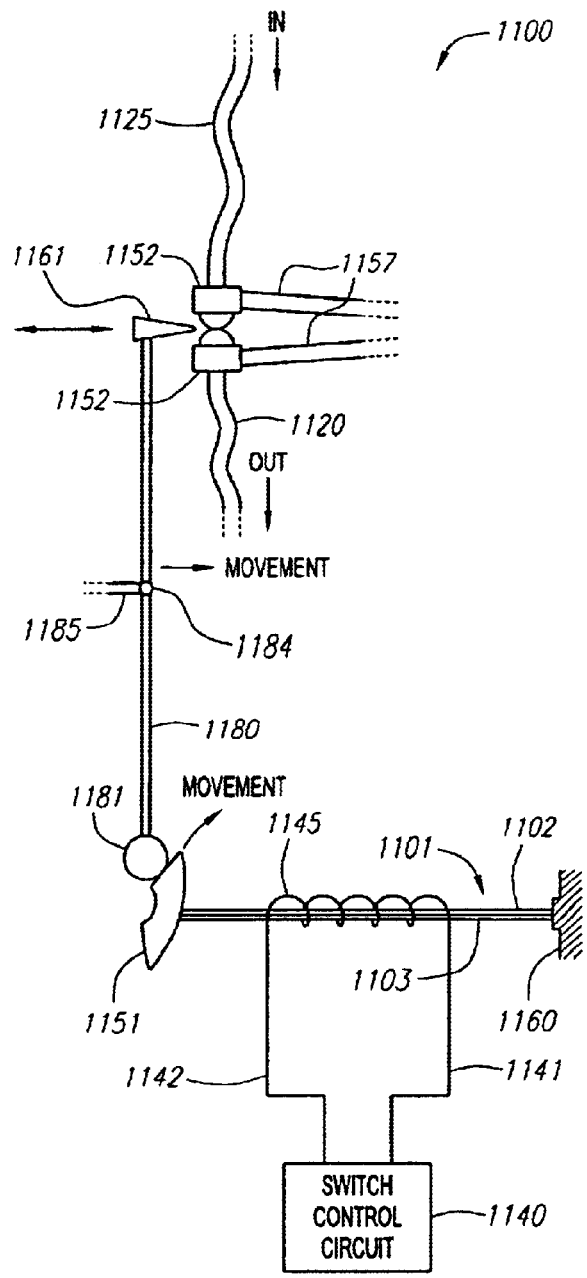
FIG. 11 is a diagram of yet another embodiment of a controllable electronic switch using a wedge to break electrical contacts in a circuit path, having a mechanical cam with multiple latching positions.

FIG. 11 is a diagram of yet another embodiment of a controllable electronic switch 1100 using a wedge-shaped member to break electrical contacts in a circuit path, again employing principles of a mechanical cam with multiple latching positions. In FIG. 11, the controllable electronic switch 1100 comprises a generally elongate deformable member 1101 which, as before, is formed of two layers 1102, 1103, similar in nature to, e.g., the deformable member(s) 301, 601 described previously with respect to FIGS. 3 and 6, respectively. In a preferred embodiment, the deformable member 1101 comprises a bimetal arm, and the two layers 1102, 1103 are metallic in nature, although more generally the two layers 1102, 1103 may be comprised of any suitable materials having sufficiently different thermal properties to carry out the functions described herein. The deformable member 1101 is preferably anchored at one end 1106 to a non-conductive surface 1105. At its other end, the, deformable member 1101 has a wedge-shaped member 1151 that, as will be described in more detail below, functions as a mechanical cam.

As further illustrated in FIG. 11, a pivoting arm 1180 is positioned between the first wedge-shaped member 1151 and a pair of electrical contacts 1152. The pair of electrical contacts 1152 reside in contact with a pair of electrical conductors 1120, 1125, the first electrical conductor 1125 serving as an incoming power wire and the second electrical conductor 1120 serving as a power delivery means to a load (not shown). In normal operation, power from the first electrical conductor 1125 is conducted through the electrical contacts 1152 to the second electrical conductor 1120 and thereby to the load. The electrical contacts 1152 are attached to a pair of non-conductive arms 1157, which are anchored to a stable surface (not shown). A pair of springs (not shown, but similar to springs 855 in FIG. 8) or other such means applies force to the non-conductive arms 1157 and thereby maintains the electrical contacts 1152 in contact in normal operation.

As further illustrated in FIG. 11, the pivoting arm 1180 has a ball 1181 at one end and a second wedge-shaped member 1161 at the opposite end. The pivoting arm 1180 may be secured to a fixed structure 1185 at, e.g., a generally centrally located pivoting point 1184.

Figure 12:
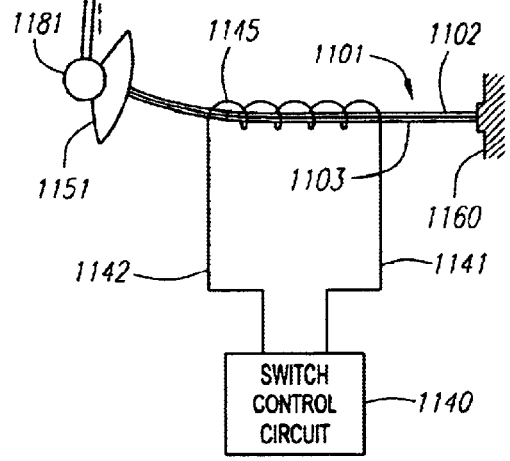
FIG. 12 is a diagram showing an example of how the controllable electronic switch shown in FIG. 11 breaks an electrical connection.

The electrical path formed across the electrical contacts 1152 may be broken by application of a control signal to the deformable member 1101. To this end, a heating element 1145 (such as a resistive coil) is coupled to the deformable member 1101. The heating element 1145 is preferably controlled by a switch control circuit 1140 connected thereto by a pair of signal lines 1141, 1142. When the switch control signal output from the switch control circuit 1140 is not asserted, the heating element 1145 is effectively disconnected (and thus inactive), and power is delivered through the incoming power wire 1125 across the electrical contacts 1152 to the electrical conductor 1120, from which it can be further distributed to the load. When, however, the switch control signal from the switch control circuit 1140 is asserted, the heating element 1145 heats up due to the effect of the current flowing through the heating element 1145, and as a result the deformable member 1101 starts to bend. Eventually, as a result of this bending, the wedge-shaped member 1151 presses the ball 1181 of pivoting arm 1180 such that it becomes displaced as the pivoting arm 880 is forced to rotate slightly in the clockwise direction. This motion forces the other end of the pivoting arm 1180 to move in a clockwise direction, which in turn forces the second wedge-shaped member 1161 between the electrical contacts 1152. This action causes the contacts 1152 to gradually separate, and breaks the electrical circuit path between the incoming power signal line 1125 and the electrical conductor 1120, as illustrated in FIG. 12.

Similar the embodiment of FIG. 8, the wedge-shaped member 1151 of the controllable electronic switch 1100 of FIG. 11 acts as a mechanical cam with multiple latching positions, thus alleviating the need to maintain the control signal to keep the circuit open. When the first wedge-shaped member 1151 is latched in a first position, it causes the second wedge-shaped member 1161 to be removed from the electrical contacts 1152, which remain closed, and the power signal circuit path is uninterrupted. On the other hand, when the first wedge-shaped member 1151 is latched in a second position, it causes the second wedge-shaped member 1161 to force the electrical contacts 1152 apart, thus interrupting the power signal circuit path. In either latched position, no power is required to keep the controllable electronic switch 1100 in its current state (open or closed). Latching of the wedge-shaped member 1151 in the various positions is accomplished, in this example, by the pivoting arm 1180 which, similar to latching member 880, is terminated in a ball 1181 that rests against the wedge-shaped member 1151.

Motion of the ball 1181 with respect to the first wedge-shaped member 1151 is similar to the described with respect to the controllable electronic switch 800 of FIG. 8 and the illustrations in FIGS. 9-1 through 9-3 and 10-1 through 10-8.

However, rather than the first wedge-shaped member 1151 itself being inserted between the contracts 1152 to open them, the first wedge-shaped member 1151 causes the pivoting arm 1180 to swing back and forth, thereby causing the second wedge-shaped member 1161 to move forwards and backwards and to open and close the electrical contacts 1152.

Figure 13:
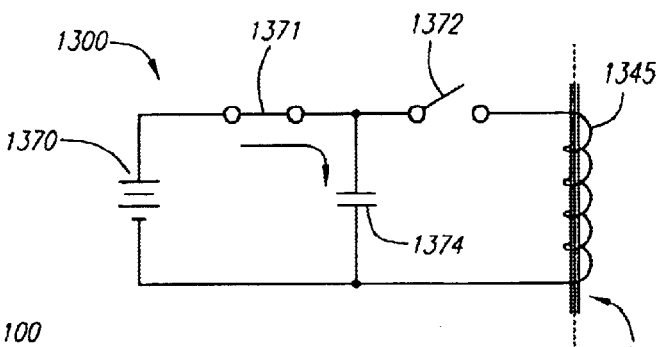
FIGS. 13, 14, and 15 are simplified schematic diagrams illustrating examples of control circuits or portions thereof that may be used with various controllable electronic switches disclosed herein.
Figure 14:
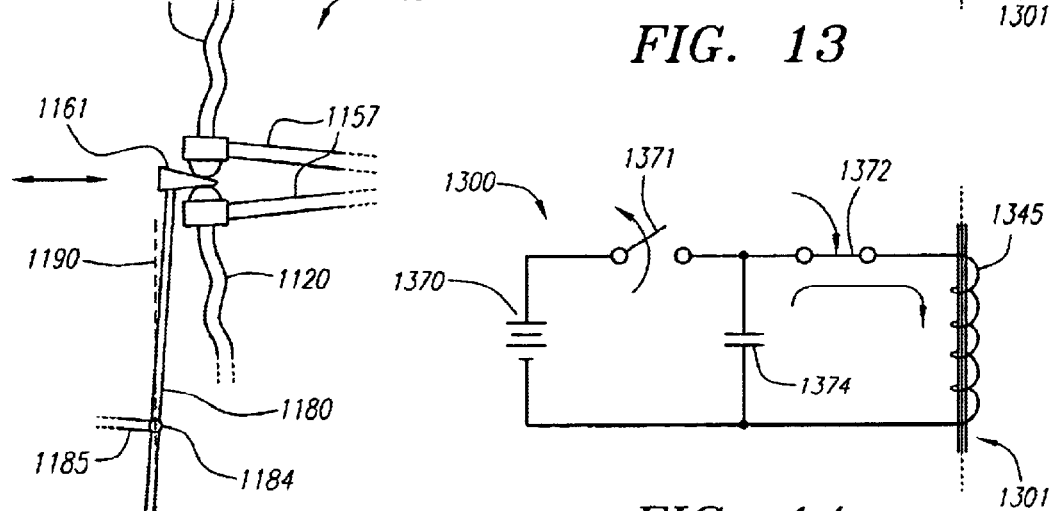
Figure 15:
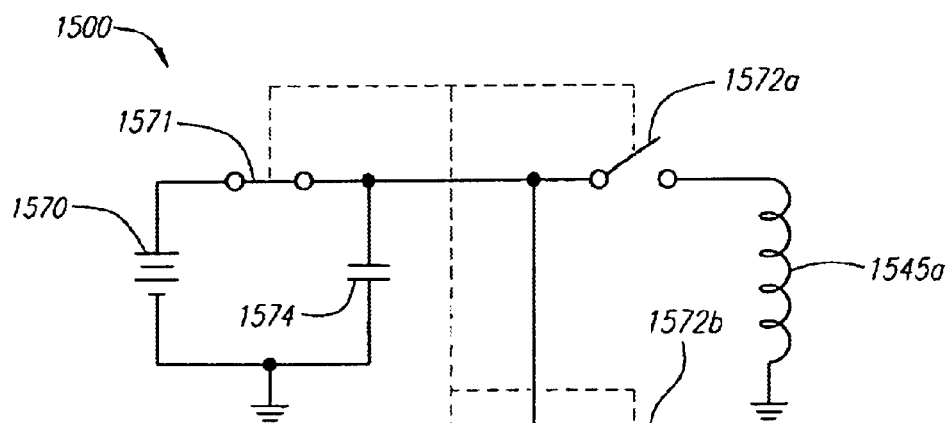

It should be noted that the embodiments illustrated in FIGS. 8 and 11, and elsewhere, are merely examples and are not intended to be exhaustive nor limiting of the concepts and principles disclosed herein. While certain cam mechanisms have been described and illustrated, and cam or other similar mechanism may also be used to perform similar functions. Alternative embodiments may include, for example, any member that is used in connection with separating electrical contacts (or other type of circuit connection), has at least one stable position and one or more unstable positions, and transitions between the stable and unstable positions through application of a control signal. A variety of different mechanical structures can be utilized in place of the wedge-shaped member(s) described herein and illustrated in the drawings FIGS. 13, 14, and 15 are simplified schematic diagrams of examples of control circuits or portions thereof that may be used with various controllable electronic switches disclosed herein. In FIG. 13, a control signal generator 1300 includes a power source 1370 (e.g., battery or other DC source) connected via a first switch 1371 to a capacitor 1374. The capacitor 1374 is connected via a second switch 1372 to a heating element 1345, such as a resistive coil, which is proximate to a deformable member 1301. The heating element 1345 and deformable member 1301 may represent similar components which are illustrated in FIG. 8 or 11 or any of the other controllable electronic switch embodiments described herein.

In operation, the power source 1370 maintains capacitor 1374 in a charged state when switch 1371 is closed and switch 1372 is open. Since switch 1372 is open, the heating element 1345 is disengaged, and the deformable member 1301 remains in its natural unheated state. To apply a control signal to the heating element 1345, a control circuit (not shown) opens switch 1371 and closes 1372, as illustrated in FIG. 14. As a result, power source 1370 is disengaged from capacitor 1374, and the capacitor 1374 discharges into the heating element 1345. The capacitor 1374 may be selected to be of sufficient size and rating to hold the appropriate amount of charge to cause heating element 1345 to heat up sufficiently to cause the deformable member 1301, particularly if embodied as a latching cam mechanism (such as in FIGS. 8 and 11, for example), to be forced into the next latched state. Once the capacitor 1374 has been substantially discharged, switch 1371 may be closed and switch 1372 opened, to recharge the capacitor 1374. The switches 1371, 1372 may then again be toggled to discharge the capacitor 1374 a second time and cause the deformable member 1301, where embodied as a latching cam mechanism, to be forced into another latched state (or returned to its original latched state).

FIG. 15 applies the same principles of FIGS. 13 and 14 to a system of controllable electronic switches. The control circuit system 1500 of FIG. 15 includes a power source 1570 and capacitor 1574 similar to the counterparts of FIGS. 13 and 14. A first switch 1571 is analogous to switch 1371 in FIGS. 13 and 14, and is generally closed when charging the capacitor 1574. When it is desired to activate the controllable electronic switches, a control circuit 1576 opens switch 1571 and closes the switches 1572*a*, 1572*b*, 1572*c*, . . .

associated with the controllable electronic switches to be activated. Only selected ones of the switches 1572a, 1572b, 1572c, . . . need be activated, according to the programming of the control circuit 1576. For the switches 1572a, 1572b, 1572c, . . . that are closed, the respective heating elements (e.g., resistive coils) 1545a, 1545b, 1545c, . . . heat up, causing deformation of the proximate deformable members and activation of the controllable electronic switches according to principles previously described herein.

Figure 16:
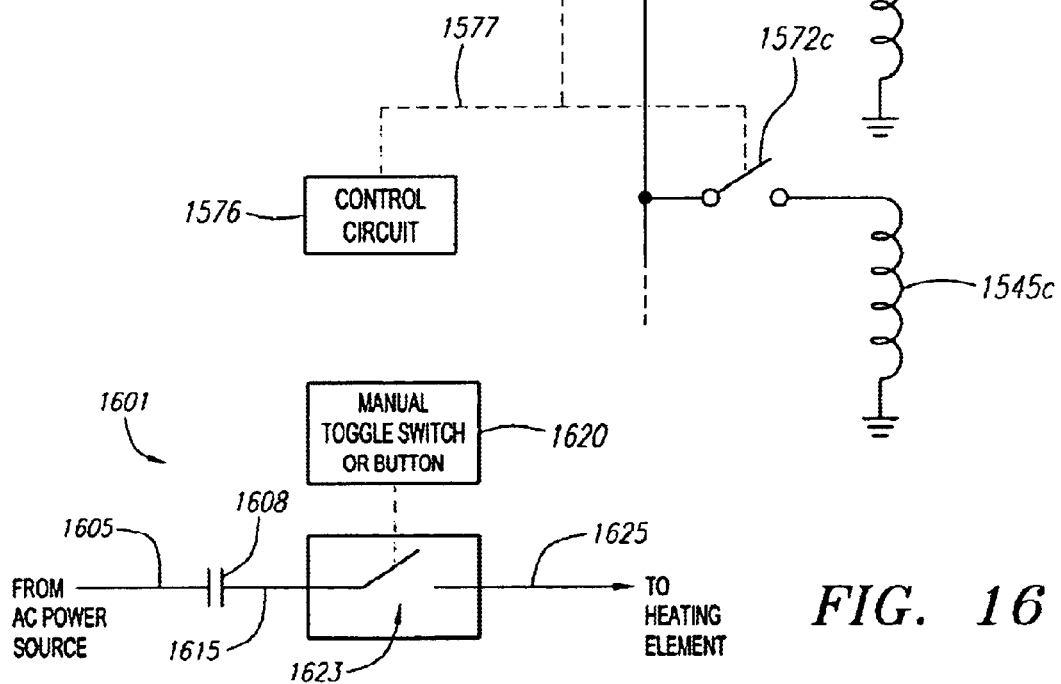
FIG. 16 is a diagram of one embodiment of a switch control circuit as may be used in connection with various controllable electronic circuit embodiments shown or described herein.

FIG. 16 is a diagram of an embodiment of a switch control circuit 1601 as may be used in connection with various controllable electronic switch embodiments shown or described herein—for example, the controllable electronic circuits shown in FIG. 3, 5, or 6, or others. As illustrated in FIG. 16, the switch control circuit 1601 comprises an incoming AC power signal 1605 which is coupled to a capacitor 1608, which in turn is connected to a heating element (not shown) via an electronic or electromechanical switch 1623. A manual toggle switch or button 1620 is used to activate the electronic or electromechanical switch 1623, which selectively allows the incoming power signal 1605 to pass to the heating element 1625. The incoming AC power signal 1605 may be, e.g., single-phase electrical power drawn from a power line, and the design illustrated in FIG. 16 thereby provides a low cost, high efficiency mechanism (with minimal current drain) for activating the controllable electronic switch.

Figure 17:
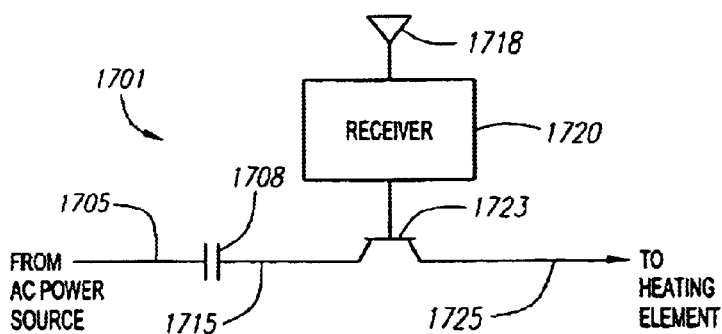
FIG. 17 is a diagram of another embodiment of a switch control circuit as may be used in connection with various controllable electronic circuit embodiments as shown or described herein.

FIG. 17 is a diagram of another embodiment of a switch control circuit 1701 as may be used in connection with various controllable electronic switch embodiments as shown or described herein—for example, the controllable electronic circuits shown in FIG. 3, 5, or 6, or others. As illustrated in FIG. 17, the switch control circuit 1701 comprises an incoming AC power signal 1705 which is coupled to a capacitor 1708, which in turn is connected to a heating element (not shown) via an electronic 1723. A receiver 1720 receives a remote command signal via antenna 1718 and, in response thereto, opens or closes the switch 1723, which selectively allows the incoming power signal 1605 to pass to the heating element 1725. The receiver 1720 may be configured to communicate using any wireless technique, and may, for example, be advantageously configured to receive signals transmitted using either frequency shift keying (FSK) or FM sideband transmission. More complicated commands may be delivered via the receiver 1720, thereby allowing the switch control circuit 1701 to be utilized as part of a circuit control system that controls the states numerous controllable electronic switches and allows more complex processes and decisions to be carried out. The incoming AC power signal 1705 may be, e.g., single-phase electrical power drawn from a power line, and the design illustrated in FIG. 17 thereby provides a relatively low cost, flexible, and high efficiency mechanism (with minimal current drain) for activating the controllable electronic switch.

Various embodiments as disclosed herein provide a simple, effective, reliable and inexpensive controllable electronic switch capable of controlling the distribution of power signals (either low voltage and/or current or high voltage and/or current) from a power signal source to a load. Moreover, the controllable electronic switch need not consume any power when the switch is closed, and takes only minimal or no power to open and maintain open. Certain embodiments can allow remote operation of the controllable electronic switch, thus providing a flexible and convenient mechanism to control power distribution. The various embodiments as disclosed herein may be utilized in connection with power control systems and circuits disclosed, for example, in copending U.S. patent application Ser. Nos. 10/007,501 and/or 10/006,463, both of which were filed Nov. 30, 2001, are assigned to the assignee of the present invention, and are hereby incorporated by reference as if set forth fully herein.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A controllable electronic switch, comprising:
 a pair of electrical contacts, one of said electrical contacts connected to an incoming power wire and the other connected to an electrical conductor;
 a bimetal arm;
 a wedge-shaped member proximate to said pair of electrical contacts, said wedge-shaped member attached to one end of said bimetal arm;
 a heating element coupled to the bimetal arm; and
 a switch control signal controlling said heating element, whereby said heating element is caused to heat to a point sufficient to bend said bimetal arm and thereby cause said wedge-shaped member to force open said pair of electronic contacts or allow them to close, thus breaking or making contact between the incoming power wire and the electrical conductor.

2. The controllable electronic switch of claim 1, wherein said wedge-shaped member acts as a mechanical cam having multiple latching states.

3. The controllable electronic switch of claim 2, wherein said wedge-shaped member comprises a front wedge section, a central socket, and a rear wedge section, and wherein the controllable electronic switch further comprises a locking member adapted to be received by the central socket and thereby place the wedge-shaped member in a latching position.

4. The controllable electronic switch of claim 2, wherein the heating of said heating element switches the wedge-shaped member among the multiple latching states.

5. The controllable electronic switch of claim 1, wherein said wedge-shaped member is attached to a pivoting arm, said pivoting arm being caused to rotate about a pivot point when said bimetal arm bends.

6. The controllable electronic switch of claim 1, wherein power is conveyed from the incoming power wire to a remote load through the electrical conductor when said pair of electrical contacts are in contact with one another, and wherein no power is conveyed to the remote load when said pair of electrical contacts are separated from one another.

7. The controllable electronic switch of claim 1, wherein said heating element comprises a resistive coil.

8. The controllable electronic switch of claim 1, wherein said switch control signal is generated via manual activation.

9. The controllable electronic switch of claim 1, wherein said switch control signal is generated via an electronic command signal received from a remote source.

10. The controllable electronic switch of claim 1, wherein said bimetal arm has a top side comprised of a first metallic substance and a bottom side comprised of a second metallic substance having different thermal properties than the first metallic substance.

11. A controllable electronic switch, comprising:
 a pair of electrical contacts, one of said electrical contacts connected to an incoming power wire and the other connected to an electrical conductor;

a bimetal arm;

a wedge-shaped member proximate to said pair of electrical contacts;

a heating element coupled to the bimetal arm; and a switch control signal controlling said heating element, whereby said heating element is caused to heat to a point sufficient to bend said bimetal arm and thereby cause said wedge-shaped member to force open said pair of electronic contacts or allow them to close, thus breaking or making contact between the incoming power wire and the electrical conductor;

wherein power is conveyed from the incoming power wire to a remote toad through the electrical conductor when said pair of electrical contacts are in contact with one another, and wherein no power is conveyed to the remote load when said pair of electrical contacts are separated from one another.

12. A method, comprising the steps of:

connecting a first one of a pair of electrical contacts to an incoming power wire and the second one of said pair of electrical contacts to an electrical conductor;

coupling a heating element coupled to a bimetal arm;

positioning a wedge-shaped member proximate to said pair of electrical contacts, said wedge-shaped member attached to one end of said bimetal arm; and controlling said heating element with a switch control signal, whereby said heating element controllably bends said bimetal arm thereby causing said wedge-shaped member to open or close said pair of electronic contacts, thus breaking or making contact between the incoming power wire and the electrical conductor.

13. The method of claim 2, wherein said wedge-shaped member acts as a mechanical cam having multiple latching states.

14. The method of claim 13, wherein said wedge-shaped member comprises a front wedge section, a central socket, and a rear wedge section, and wherein the method further comprises the step of placing the wedge-shaped member in a latching position by receiving a locking member in the central socket.

15. The method of claim 13, further comprising the step of heating said heating element to switch the wedge-shaped member among the multiple latching states.

16. The method of claim 12, further comprising the steps of:

attaching said wedge-shaped member to a pivoting arm, and rotating said pivoting arm about a pivot point when said bimetal arm bends.

17. The method of claim 12, further comprising the steps of conveying power from the incoming power wire to a remote load through the electrical conductor when said pair of electrical contacts are in contact with one another, and preventing power from being conveyed to the remote load when said pair of electrical contacts are separated from one another.

18. The method of claim 12, wherein said heating element comprises a resistive coil.

19. The method of claim 12, further comprising the step of manually activating said switch control signal.

20. The method of claim 12, further comprising the step of activating said switch control signal by an electronic command signal received from a remote source.

21. The method of claim 12, wherein said bimetal arm has a top side comprised of a first metallic substance and a bottom side comprised of a second metallic substance having different thermal properties than the first metallic substance.

22. A method, comprising the steps of:

connecting a first one of a pair of electrical contacts to an incoming power wire and the second one of said pair of electrical contacts to an electrical conductor;

coupling a heating element coupled to a bimetal arm;

positioning a wedge-shaped member proximate to said pair of electrical contacts;

controlling said heating element with a switch control signal, whereby said heating element controllably bends said bimetal arm thereby causing said wedge-shaped member to open or close said pair of electronic contacts, thus breaking or making contact between the incoming power wire and the electrical conductor; and conveying power from the incoming power wire to a remote load through the electrical conductor when said pair of electrical contacts are in contact with one another, and preventing power from being conveyed to the remote load when said pair of electrical contacts are separated from one another.

\* \* \* \* \*